United States Patent [19]

Tomlinson et al.

[11] 4,156,482
[45] May 29, 1979

[54] TILE STACKING MACHINE

[76] Inventors: Robert K. Tomlinson; Mepham W. James, both of 743 Port Rd., Woodville, Australia, 5011

[21] Appl. No.: 822,335

[22] Filed: Aug. 5, 1977

[30] Foreign Application Priority Data

Aug. 6, 1976 [AU] Australia .............................. 6897/76
Nov. 10, 1976 [AU] Australia .............................. 8086/76

[51] Int. Cl.² ...................... B65G 47/24; B65G 57/32
[52] U.S. Cl. .................................. 198/411; 198/425; 271/181; 414/103
[58] Field of Search ............... 198/406, 408, 409, 411, 198/412, 413, 425, 460, 462, 489, 626; 271/150, 181, 214, 215; 214/7

[56] References Cited

U.S. PATENT DOCUMENTS

| 2,358,413 | 9/1944 | Monaco | 214/7 |
| 3,155,221 | 11/1964 | Griner | 198/425 |
| 3,395,784 | 8/1968 | Kanarek | 198/425 |
| 3,831,784 | 8/1974 | Newell | 271/214 |

FOREIGN PATENT DOCUMENTS

| 2145599 | 5/1972 | Fed. Rep. of Germany | 198/408 |
| 766133 | 6/1934 | France | 271/214 |

Primary Examiner—Robert B. Reeves
Assistant Examiner—Jeffrey V. Nase
Attorney, Agent, or Firm—Jay L. Chaskin

[57] ABSTRACT

The invention resides in firstly conveying tiles edgeways, while "on flat", in a conveyor which terminates in a discharge station which is vertical or nearly vertical, and transferring the tiles to a further conveyor which conveys them at reduced speed, while they are supported on edge, so that the tiles stack in face to face juxtaposition. The tiles can then be removed as a stack from the further conveyor.

17 Claims, 16 Drawing Figures

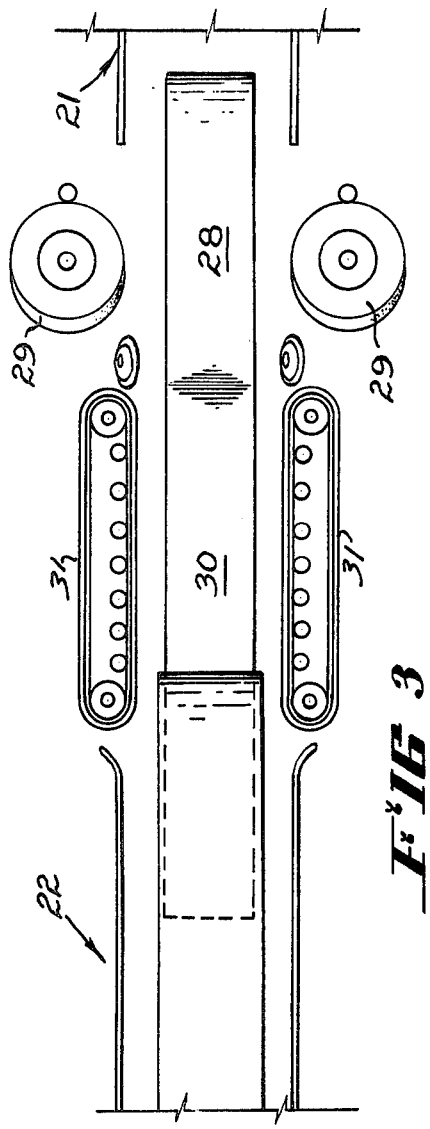
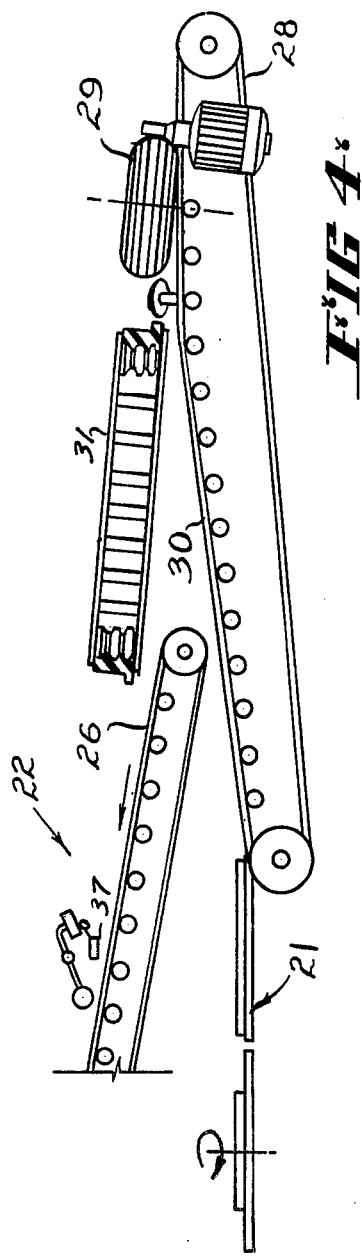

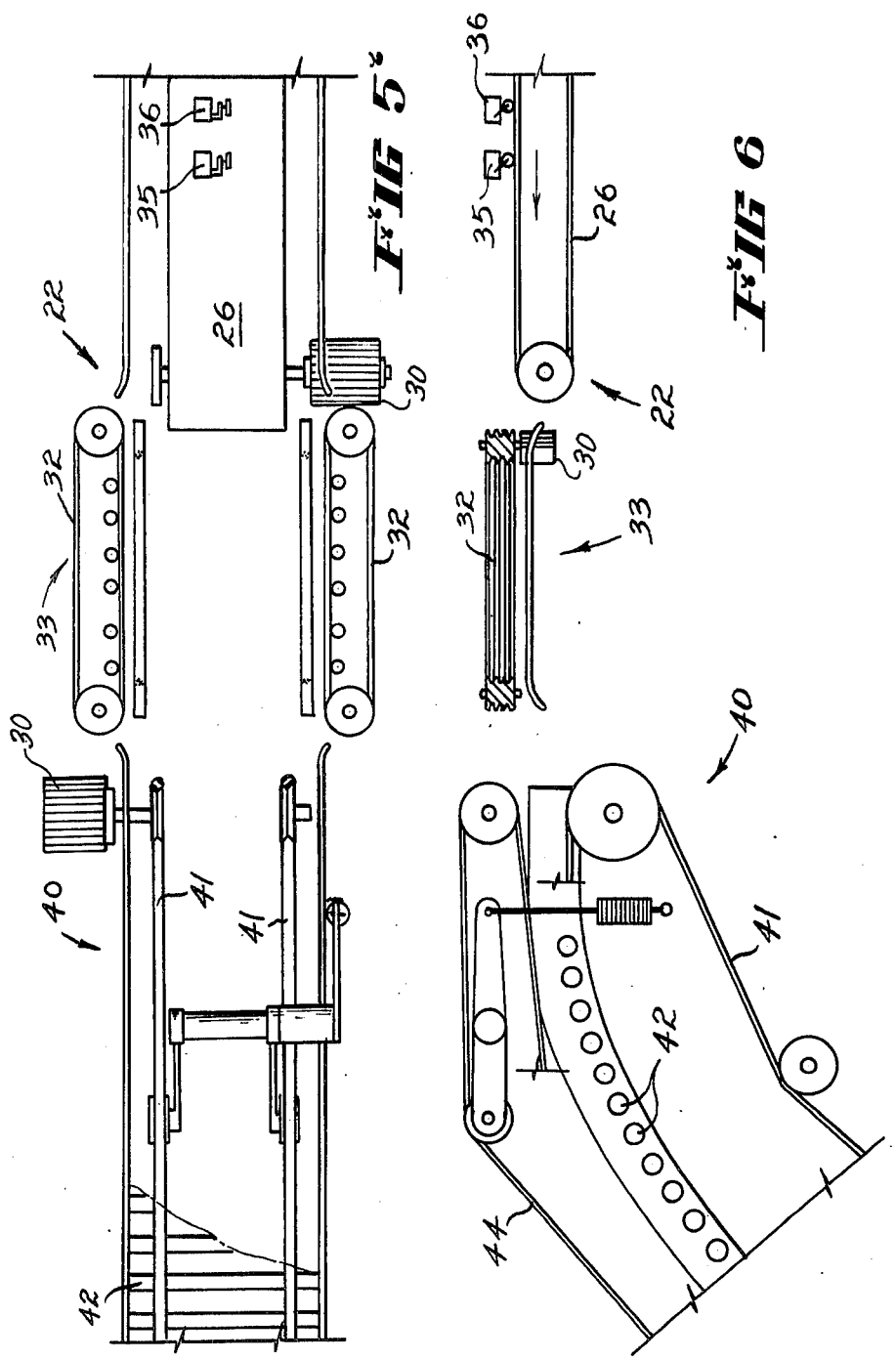

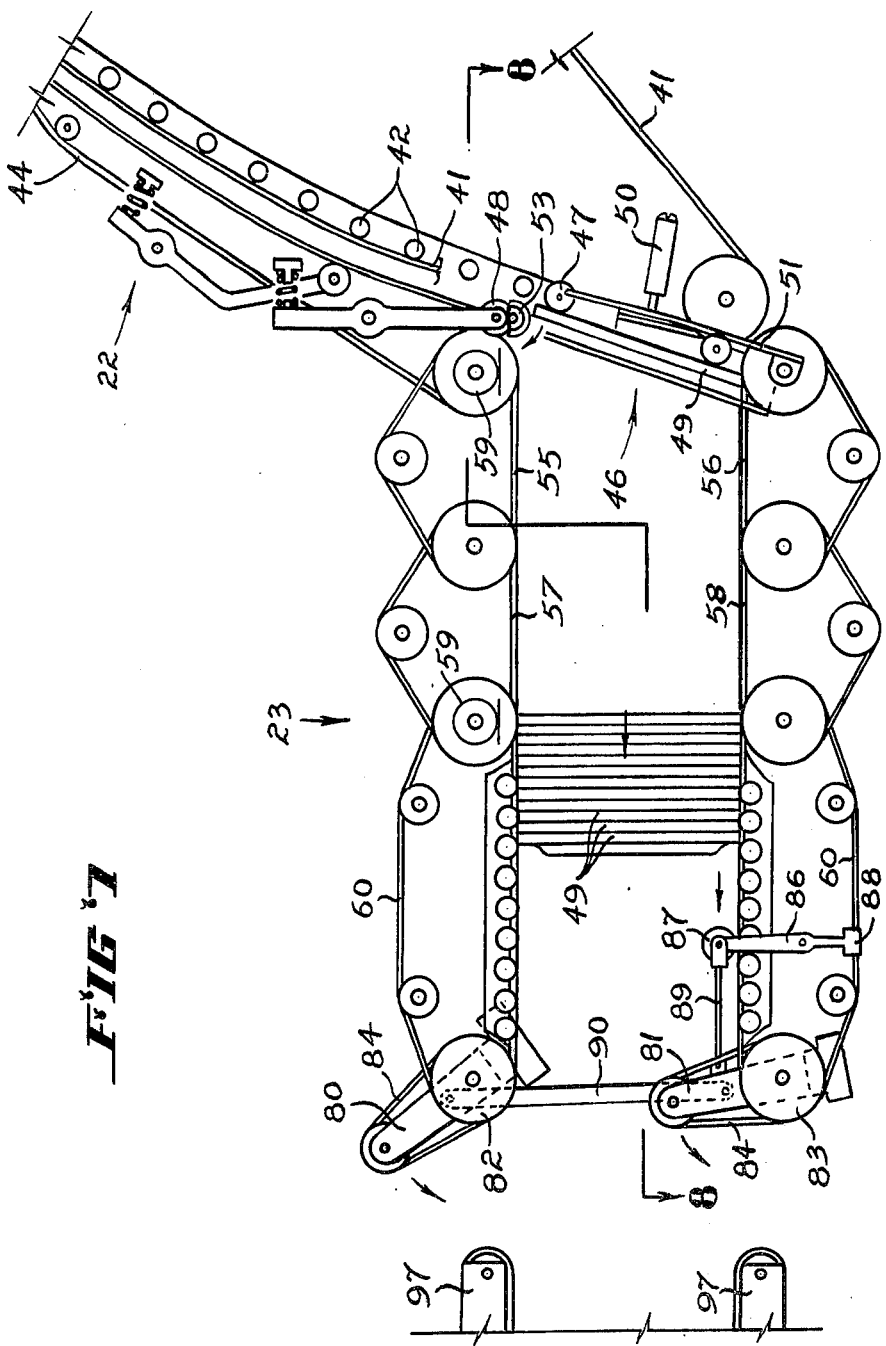

TILE STACKING MACHINE

This invention relates to a method of stacking tiles, slabs, blocks, bricks or the like, and to a machine which is useful for the stacking of tiles, slabs, blocks, bricks or the like, and is particularly valuable in the stacking of roofing tiles, which are not planar. However, in almost all instances, a tile has four edges and two faces of relatively large area, and this invention is applicable to the handling of such tiles.

BACKGROUND OF THE INVENTION

When roofing tiles are formed from cement and sand mixture, they are produced in very large numbers and in order to reduce the number of moulding pallets to a minimum, the tiles are steam cured and removed from the pallets as quickly as possible. However they are of an awkward shape to automatically handle because of the existence of the troughs and lugs, and further because different pallets produce tiles of slightly varying shape, and because the tiles require handling before they have attained their 28 day strength. In addition to this, when the tiles move in a factory, they are usually transported edgeways, while "on flat", by a conveyor belt, but to reduce breakages, they are finally stacked "on edge" in face to face juxtaposition. This means therefore that the speed of movement at stacking must be reduced to a small fraction of the speed of movement of the edgeways conveyor belts, since tiles in face to face juxtaposition occupy less conveyor length than when in edge to edge juxtaposition.

It is therefore the main object of this invention to provide a method and a machine whereby tiles can be conveyed firstly on flat, with one edge leading another (at relatively high speed), and subsequently placed "on edge" in close proximity to one another, in face to face juxtaposition.

Tiles are not always released at identical speeds, nor at equal spacings, and it is often necessary to have them spaced from one another. It is another object of this invention to provide a machine which is capable of stacking tiles notwithstanding variations in spacings between them while they are released and conveyed on flat edgeways.

A still further object of the invention is to provide a machine and a method of stacking tiles which enables them to be stacked with a minimum of handling by operators.

BRIEF SUMMARY OF THE INVENTION

Briefly, the invention resides in firstly conveying tiles edgeways, while "on flat", in a conveyor which terminates in a discharge station which is vertical or nearly vertical, and transferring the tiles to a further conveyor which conveys them at reduced speed, while they are supported on edge, so that the tiles stack in face to face juxtaposition. The tiles can then be removed as a stack from the further conveyor.

More specifically, the method of the invention comprises:

(a) supporting each tile successively by one of its relatively large area surfaces in proximity to a first conveyor means, (b) conveying each successive said tile edgeways with said first conveyor means so that one tile edge leads another tile edge, (c) gradually tilting each successive said tile while it is being thus conveyed so that it has one of its said edges below the other of its said edges, (d) transferring each successive said tile from the proximity of said first conveyor means to the proximity of a further conveyor means and supporting said tile by its said lower edge, (e) driving said further conveyor means so as to convey each successive said tile while supported by its lower edge, with one of its relatively large area surfaces leading the other relatively large area surface, and at such lower speed than said first conveyor means that successive tiles are caused to lie in close proximity to one another while being conveyed by the further conveyor means, and (f) removing said tiles from the proximity of said further conveyor means in face to face juxtaposition as a stack.

Further, a machine according to this invention comprises:

first conveyor means having a curved portion which terminates in a tile discharge station at which said first conveyor means has a vertical component of direction, and first conveyor drive means coupled for drive to the first conveyor means, arranged to convey tiles edgeways at relatively high speed from the tile making machine to the discharge station, further conveyor means having its loading end at the proximity of the discharge station, said further conveyor means comprising spaced resilient conveyor belts, and further drive means coupled for drive to the conveyor belts and arranged to convey tiles discharged from said discharge station while supported on their lower edges by the lower of said conveyor belts, said further drive means driving said conveyor belts at such relatively slow speed that the tiles are in face to face juxtaposition, and tile removing means at the proximity of said further conveyor.

With this invention it becomes possible to handle tiles which have relatively low strength (before the 28 day strength has been attained) and the amount of damage inflicted upon the tiles can be maintained at a minimum. For example in the case of roofing tiles having lugs, the tiles may be engaged on or adjacent the lugs, this being the strongest locality of the tile. Various means may be utilised to tilt the tiles from an "on flat" position to an "on end" or "on edge" position, for example the tiles may be carried by a conveyor belt over a pulley or a series of pulleys so that it is moving with a downward component of movement and then engage the lower belts of spaced parallel conveyor belts, the tile then being urged into engagement with upper belts to be traversed while gripped by the belts. Alternatively, the tiles may be gripped on their edges by belts which move at different speeds so that the rear edge of the tile is rotated to become the upper edge during the traverse between the belts.

BRIEF DESCRIPTION OF THE DRAWINGS

An embodiment of the invention is described hereunder in some detail with reference to and is illustrated in the accompanying drawings, in which FIG. 3 is a plan view of a tile depalleting device, and the first conveyor comprised in said first conveyor means, FIG. 4 is an elevational view of FIG. 3, FIG. 5 is a plan view of a second conveyor (a "crowding" conveyor) comprised in said first conveyor means, FIG. 6 is an elevational view of FIG. 5, FIG. 7 is an elevational view showing the transfer station of the first conveyor means, and also showing the second conveyor means.

Figure 1:
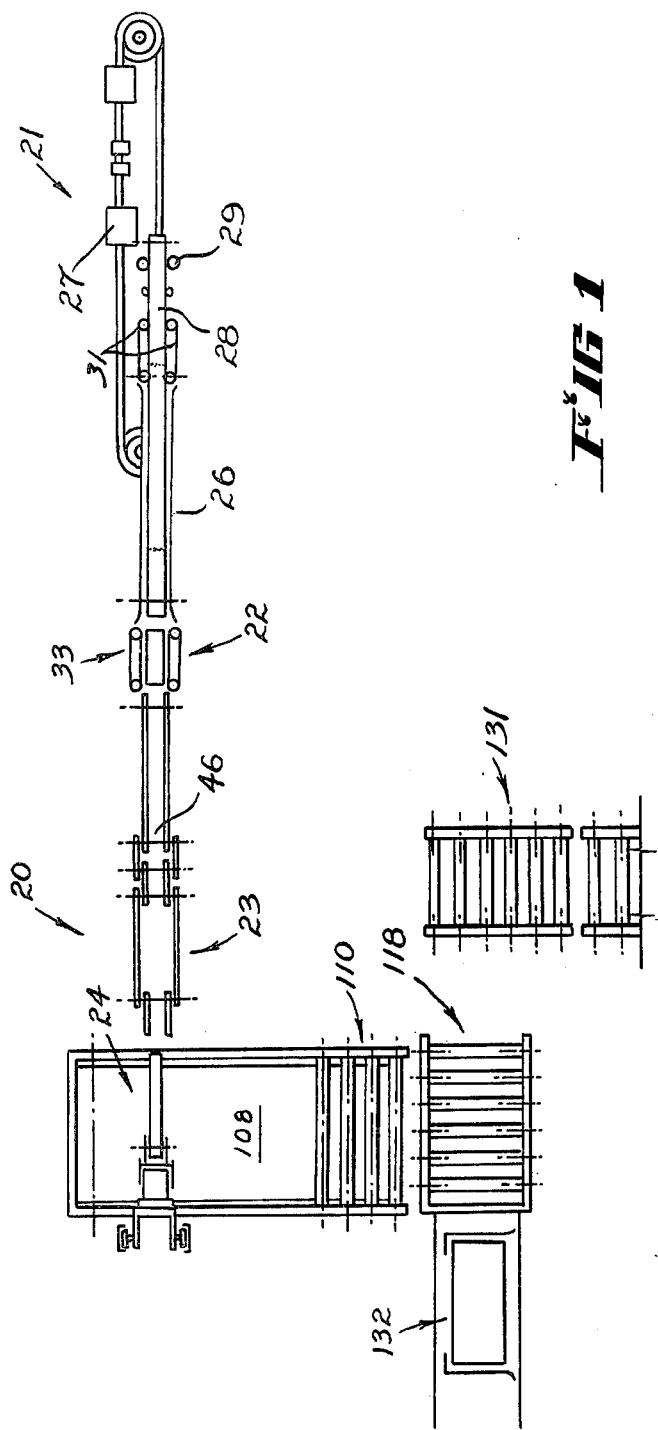
FIG. 1 is a layout plan view of a tile making machine and the tile stacking machine of this invention.
Figure 2:
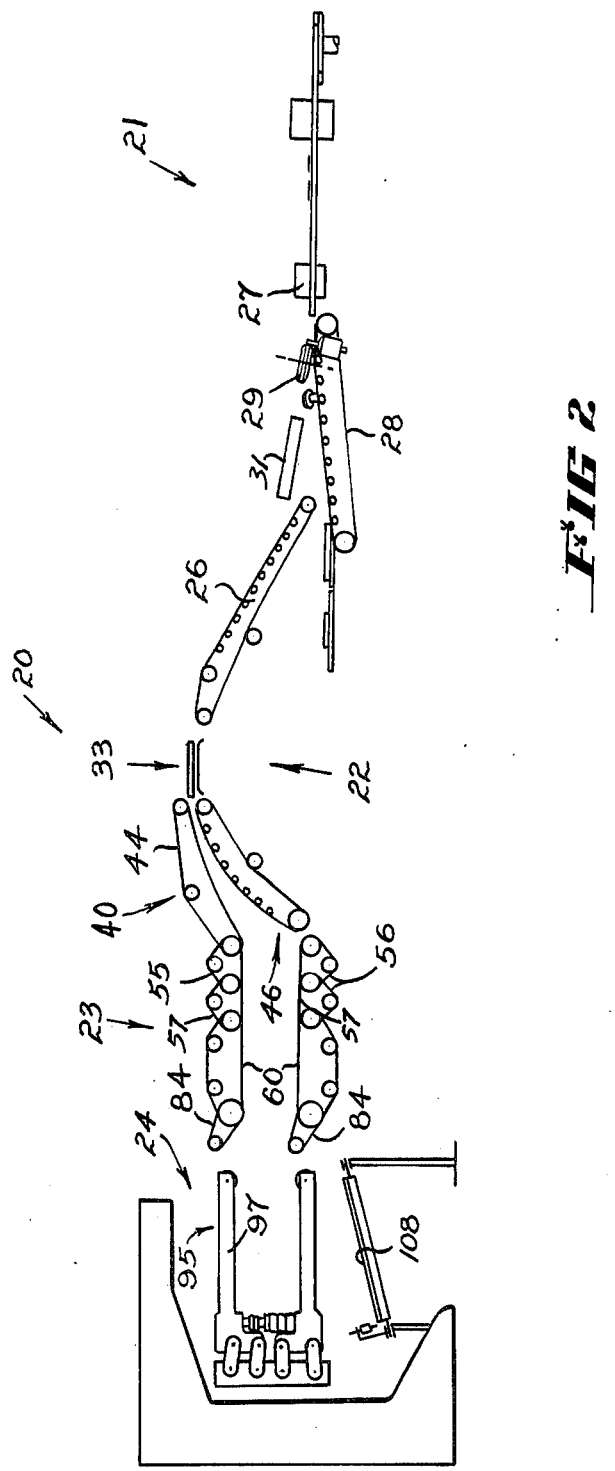
FIG. 2 is an elevational view of FIG. 1.

Referring first to FIGS. 1 and 2, a tile stacking machine 20 is located "downstream" of a tile making machine 12, and is characterised, inter alia, by first conveyor means 22 (comprising three conveyors described hereunder), further conveyor means 23, and tile removing means 24.

The first stage for the tile stacking machine is the depalleting of (the separation of) tiles from pallets and transfer to the first conveyor 26 of first conveyor means 22. The tiles are initially moulded at a moulding station 27 on tile moulding pallets which are formed of metal and which support the tiles while in the green state. The tiles are steam cured, and are progressed from a curing oven onto an upwardly sloping pallet support conveyor belt 28 (FIGS. 3 and 4) which supports the pallets in turn. The upwardly sloping conveyor belt traverses the tiles and pallets between rotationally driven pneumatic tyred wheels 29 which grip the tile side edges to cause the tiles to continue their upward traverse while the pallets fall onto a downwardly sloping portion 30 of the conveyor belt 28 to be delivered to a cleaning station for further use. The tiles however continue their upwardly sloping traverse and are carried by side belts 31 to the first conveyor belt 26 of first conveyor means 22. At this stage the tiles are spaced randomly on the upwardly sloping conveyor belt 26, since they are stripped from the pallets and released onto belt 26 at random intervals of time. The tiles are carried by belt 26 at a faster rate than on the tile making machine 21. Belt 26 is driven by motor 30 (FIG. 5).

The next stage is to crowd the tiles and then progress them at a constant spacing. This is achieved by means of a pair of spaced parallel control belts 32 (driven by second motor 30) which comprise a second conveyor 33 of the first conveyor means 22, situated at the top end of the rising conveyor 26 carrying the tiles. The control belts 32 move at a relatively low speed, slower than the speed of the rising conveyor 26. The control belts 32 are merely two rubber belts each supported by a pair of pulleys, and positioned one each side and so spaced that when a tile is placed between them, it is frictionally engaged on both its side edges by the respective belts. The stream of tiles can be stopped and started by stopping and starting the control belts 32. The reason that the speed is reduced to be less than the speed on the rising conveyor is to cause the tiles to be crowded on the top end of the rising conveyor 26 which skids beneath them while they await reception by the control belts 32. Thus the tiles should be "crowded" edge to edge on the second conveyor 33. Two limit switches 35 and 36 are positioned above belt 26 near its upper end, the switch 36 sensing an adequate number of tiles crowded on the rising conveyor and the switch 35 for sensing a minimum number, this controlling actuation of the control belts. (The switches 35 and 36 are more widely spaced than appears from the drawings FIGS. 5 and 6.) Limit switch 37 is positioned above belt 26 near its lower end sensing the maximum number of tiles crowded on the belt. In the event that there are more than the maximum number, the tile making machine 21, belt 28 and the wheels 29 all stop so as to avoid congestion at the lower end of belt 26.

Downstream of the control belts 32 is disposed a third conveyor 40 of the first conveyor means 22 driven by a third motor 30, and this third conveyor 40 conveys the tiles beyond the control belts 32, running at a slightly greater speed so that the tiles which are crowded by the control belts 32 are separated by a relatively constant spacing. The third conveyor 40 is constituted by a pair of spaced parallel V-section belts 41, each having in cross-section a "sandwich" of soft sponge rubber covered by a wearing surface of relatively hard rubber. These belts pass over a series of rollers 42 which cause them to move in an arc, and the arc has such radius that the tile lugs (batten lugs) are supported by the spaced belts (which are correctly spaced for this purpose), thereby reducing danger of excessive damage to the tiles. The tiles are supported by the lug portions alone and the centre portions of the tiles are out of contact with the belts.

Since the tiles start to move downwardly, there is an inherent danger of the gap varying and to reduce this danger the tiles are retained in their spaced positions over the entire curve radius by outer rubber backed V-belts 44 bearing against the upper surfaces of tiles.

Referring now to FIG. 7, the last 60 cm of the V-belts 41 cease to be curved and are straight, sloping at about 10° to the vertical at a discharge station 46. This facilitates control of the toe (or lower edge) of the tile as it emerges from the restraining outer V-belt 44 which terminates above the lower end of the bottom belt 41. However before emerging from the restraining belt 44, the toe of the tile depresses two spring-loaded rubber rollers 47 which are held in their retracted positions by the tile which in turn is held in its 10° slope position by a spring-loaded front roller 48 which engages the front surface of the tile as it emerges from the restraining belts 44.

As the upper edge of each respective tile (designated 49 in FIG. 7) leaves the influence of the front roller 48, a spring (not shown) contained in spring housing 50 causes forward ejecting movement of pivoted arm 51 which carries roller 47 on its upper end, and this moves the tile 49 towards an upright position. Driven rubber tyred roller 53 assists in this action.

The tiles are thus successively transferred to the further conveyor means 23, from moving between belts edgeways and in an "on flat" position, to moving between two pairs of spaced horizontal belts 55 and 56 in an "on edge" position which progresses each tile 49 with one of its relatively large area surfaces leading the other. Each pair of horizontal belts comprise two groups of spaced V-belts each of which is provided with a sponge rubber layer on its outer peripheral surface, and the sponge rubber layer is provided with a wearing layer of harder rubber having similar characteristics to the characteristics of a motor vehicle tyre. As the upper portion of each tile is ejected, the tile upper edge is frictionally engaged by the upper belts 55 which run at the same speed as the lower belts 56 to firmly grip the tile between the belts.

Figure 8:
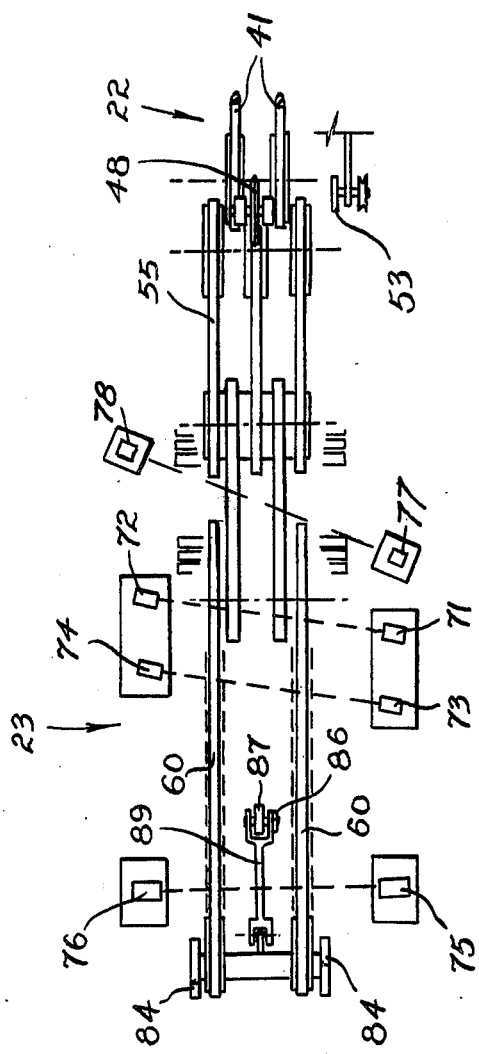
FIG. 8 is a diagrammatic plan view of FIG. 7.
Figure 9:
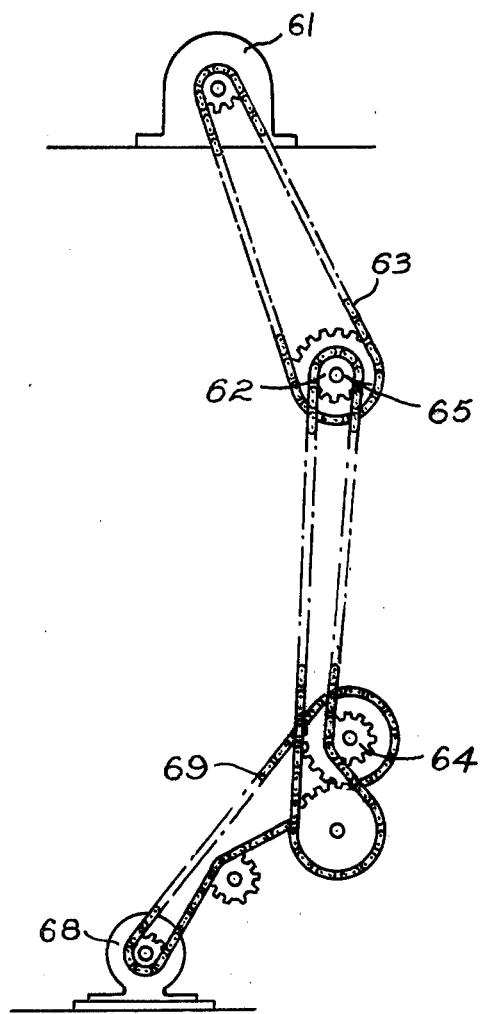
FIG. 9 illustrates diagrammatically drive means for the further conveyor means.

The further conveyor means 23 comprises horizontal belts arranged into three groups, the first group being the belts 55 and 56, and accepting the tiles 49 from the discharge station 46 in a face to face relationship with a gap of approximately 2 cm between tiles. The second group of belts 57 and 58 are slower than the first group belts therefore at the transition between the two groups the gap between tiles is reduced to approximately 1 cm. The third group of belts are herein termed transfer belts and designated 60 in FIGS. 7 and 8. The transfer belts 60 also function as stacking belts since they are used to transfer a stack of tiles to the tile removal means 24. All belts are driven by motors 59. The stacking or transfer belts are normally slower again than the second group belts 57, thereby closing up the tiles (deleting the gaps between them) and forming a reasonably tight stack. For this purpose they are driven by a slow speed (variable speed) motor/gearbox combination 61 (FIG. 9) which drives upper belt sprocket 62 through chain 63, and from upper belt sprocket 62, drives at the same speed lower belt sprocket 64, but through a sprag clutch 65. The purpose of this variable speed drive is to allow for tolerances in tile thickness, thereby enabling a reasonably "tight" stack to be achieved by increasing the speed for consistently thick tiles or decreasing the speed for consistently thin tiles. When a stack of the correct length, approximately fifty-five tiles exists between the transfer belts 60, a photo-electric cell combination (described below) causes the high speed drive motor 68 to drive the sprockets 64 and 62 (through chain 69), over-running the sprag clutch 65, and quickly transferring the stack to tile removing means 24.

The photo-electric cell combination comprises a first photo-electric cell 71 and its target 72 which stops the belts 41 and 44 and control belts 32 creating a "gap" at the rear of the stack. When the stack intercepts between the second photo-electric cell 73 and its target 74, belts 41 and 44 and 32, are re-started. When the back of the stack ceases to intercept between the third photo-electric cell 77 and its target 78, (i.e., beam across gap between stacks) the high speed transfer motor 68 becomes energised, being de-energised when the stack is fully transferred into the tile stack removing means 24. If the beams from cells 77 and 75 are simultaneously intercepted, a stack fault signal is established. The logic circuit is described hereunder. The photo-electric cells used are of the infra-red type.

The discharge ends of the transfer or stacking belts 60 are provided with upper and lower extension arms 80 and 81, each of which is pivotally movable about the axis of rotation of respective discharge end pulleys 82 and 83, each extension arm itself carrying small extension belts 84 extending around further pulleys to be driven at the same speed as the transfer belts, but the extension arms are counterweighted so that normally they lie upwardly as shown in FIG. 7 and are only deflected from their upward position by the stack of tiles as the tiles move forwardly. The lower extension arm 81 is coupled to a swinging arm 86 positioned rearwardly of the discharge end of the stacking belts and pivoted with respect to the frame which supports the discharge belts, the upper end of the swinging arm carrying on it a rubber roller 87 and the lower end, a counterweight 88. A normally horizontal link 89 connects the two arms, so that when the stack of tiles 49 engages the roller 87 to cause it to move downwardly, the lower extension arm 81 is caused to similarly move downwardly.

It is necessary that the upper extension arm should move along with the lower arm, and this is achieved by means of a link 90 pivoted at its ends to the two arms and arranged to provide a pantograph-type movement.

The tile stack removing means 24 comprises a fork head 95 which is provided with a rotational mounting 96, each fork 97 being coupled to the rotatable head by a pair of arms designated 98, which are parallel, providing a pantograph-type of lift. The two forks 97 are interengaged with pneumatically actuated means for clamping purposes, in this embodiment each fork having near its root end an L-shaped bracket 100, the two L-shaped brackets overlapping and being separated by means of two air bags 101 (or alternatively piston/cylinder combinations) which selectively function to urge the forks together or urge them apart.

Each fork 97 is provided with a pair of pulleys 103 carrying on them a pair of sponge sandwich belts 104, and these belts 104 are independently driven, the arrangement being such that the stack of tiles 49 delivered between the forks 97 from the transfer belts 60 moves between the forks at the same speed as it is discharged from the transfer belts, until a pair of photo-electric sensors 91 and 92 independently sense the upper and lower edges of the leading end of the stack, whereupon the rearward movements of the respective belts cease. This independent control ensures that the tiles are vertical when arrested. The fork head 95 is caused to rotate in either a clockwise or an anti-clockwise direction, alternately in opposite directions. The fork head 95 is then lowered by lowering means 99, its guide rollers 106 traversing a non-linear track 107 which tilts the head 95 as the stack of tiles is deposited on a transversely moving belt 108, itself tilted to guard against tile stack dislodgement.

There are a number of advantages to the arrangement of the tile removing means 24. Firstly, the "caliper" conveyors enable the stack positioning device to be a separate free standing unit which need not be mechanically connected to the remainder of the machine. Inertia problems are greatly reduced by utilising the belt arrangement described above.

Figure 12:
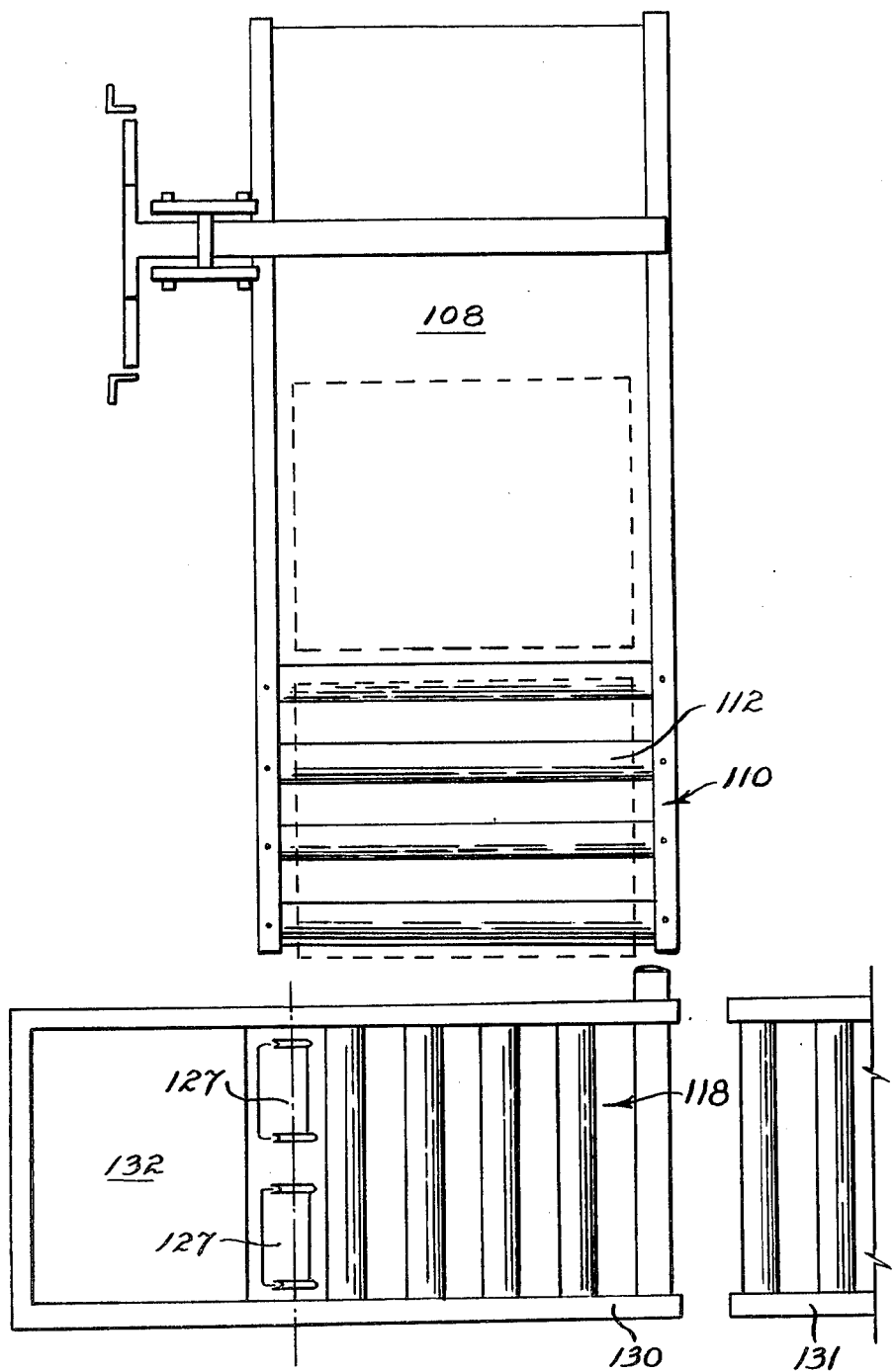
FIG. 12 is a plan view of the stack palleting arrangement.

The transverse belt 108 is a flat rubber belt conveyor which progresses the tiles transversely of their original direction to a grouping station 110 (FIG. 12) which closes the gap required by the air clamps to a 5 cm gap for a dual pack air bag clamp. At the end of the flat rubber conveyor 108 there are four parallel rubber covered free rotating rollers 112 which receive the first of a pair of stacks, and use is made of a sonic or other type of limit switch to terminate movement of the second stack when it is within 5 cm of the first. This system is found to accurately locate the two packs with respect to one another.

A clamp 114 then descends and locates between the stacks of tiles, there being a central rubber covered bar 115 and two inflatable air bags 116 spaced parallel to it. As the air bags 116 inflate upon the introduction of air pressure, and stacks are simultaneously clamped, and the clamp 114 then ascends and moves transversely across tracks to the tile stack pallet station 118. The transverse travel of the clamp is achieved by a crank arm type of mechanism 120 which facilitates accurate positioning, and which also limits damage to the tiles owing to the slow speed at which the tiles are positioned. Ascent and descent of the clamp are achieved by a motor driven sprocket 121 and chain 122 arrangement, steadied by a lower arm scissor mechanism 123. When a stack of tiles is positioned, the chain 122 slackens and the weighted arm 124 actuates switch 125.

To facilitate stacking of the tiles, a slope of between 8° to 10° is imposed on the pallet frame and the tiles are caused to slide down along strips 127 at the back of the pallet loading station, but these strips are also tilted at a slope of between 8° to 10° and cause the tiles to firmly stack against one another as they are positioned on a pallet (not shown). Spacers are then placed on top of the tile stack.

After a pallet has received three layers of tiles transferred from the conveyor 108, with spacers between the layers, the pallet is lowered from its tilted position to a horizontal position and the pallet is conveyed onto a powered roll case 130 (FIG. 12) which transfers the pallet to a turntable roll case 131 for fork lift pick-up. As the pallet moves from the loading position, a new pallet is injected beneath the sloping strips, being the bottom pallet from a magazine 132 of pallets disposed rearwardly of the pallet loading station 118.

Reference is now made to the logic diagrams of FIGS. 13, 14, 15 and 16.

Figure 13:
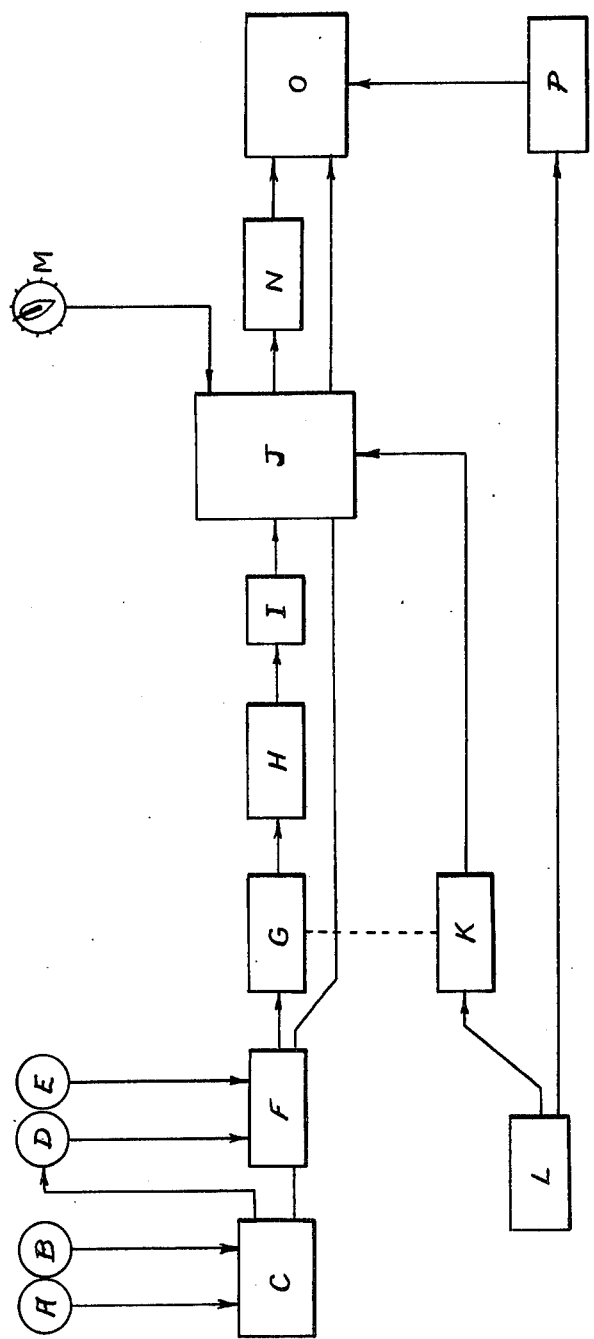
FIG. 13 is a logic diagram of the packing sequence control of the machine.

In FIG. 13, the "on" button is designated A and the "off" button is designated B, and this controls the drive means for the wheels 29, the depalleting belts 31 and the elevating conveyor 26 through a circuit designated C (FIG. 4).

Only when that circuit is energised can the automatic tile feed operate, and this is energised by the push buttons designated D and E.

Provided that the circuit F is energised and the tiles are located at the second conveyor 33 (detected by limit switch designated G, or 35 on FIG. 5) and tiles are banked up on the conveyor 26 (limit switch H, or 36 on FIG. 5) and a timer (I) has passed through a one-second delay period, then the circuit J will be energised for the belts 55, 56, 57 and 60 also energising circuit O for second and third conveyors 33 and 40 thereby stacking tiles in the further conveyor means 23. The drive means for the third group belts 60 of the further conveyor means 23 is variable, and a speed control designated M is coupled into the circuit J for varying the speed so that the "tightness" of the pack can be controlled. If however, there is no tile at second conveyor 33 (detected by limit switch designated K, 35 on FIG. 5) then when the next tile transfer at discharge station 46 is complete (detected by ultrasonic sensor L) the circuits J and therefore O will be de-energised, stopping belts 55, 56, 57, 60 and conveyors 40 and 33.

If the circuits J and O are energised, a photo-electric combination P (71-72 on FIG. 8), when interrupted, senses the correct pack length, and the second and third conveyors 33 and 40 are stopped by the circuit O, creating a gap behind the pack.

When the front of the tile pack interrupts photo-electric cell combination N (73-74 on FIG. 8) circuit O is re-energised, restarting conveyors 33 and 40.

Figure 14:
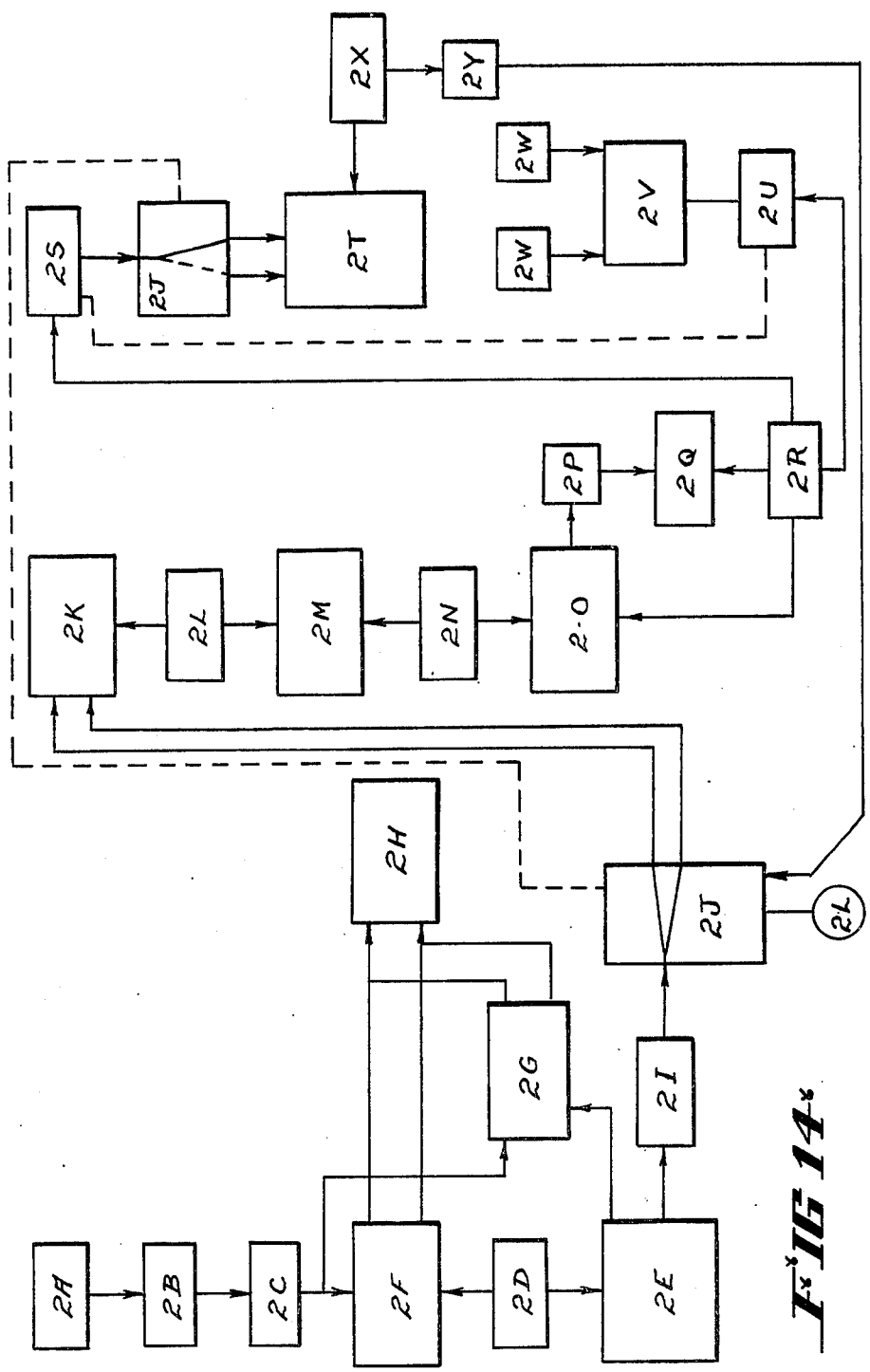
FIG. 14 is a logic diagram of the transfer sequence control of the machine.

FIG. 14 indicates the transfer sequence. The two photo-electric cell combinations 2A, 2B and limit switch 2C respectively sense that a full pack of tiles is in position for transfer (77-78 on FIG. 8), and that the pack length is correct (75-76 on FIG. 8), and that the transfer clamps are vertical. This energises circuit 2F and 2G, starting belts 104, and circuit 2H, starting the drive motor 68 thereby running belts 60 and 84 at the same speed as belts 104 (high speed).

Figure 10:
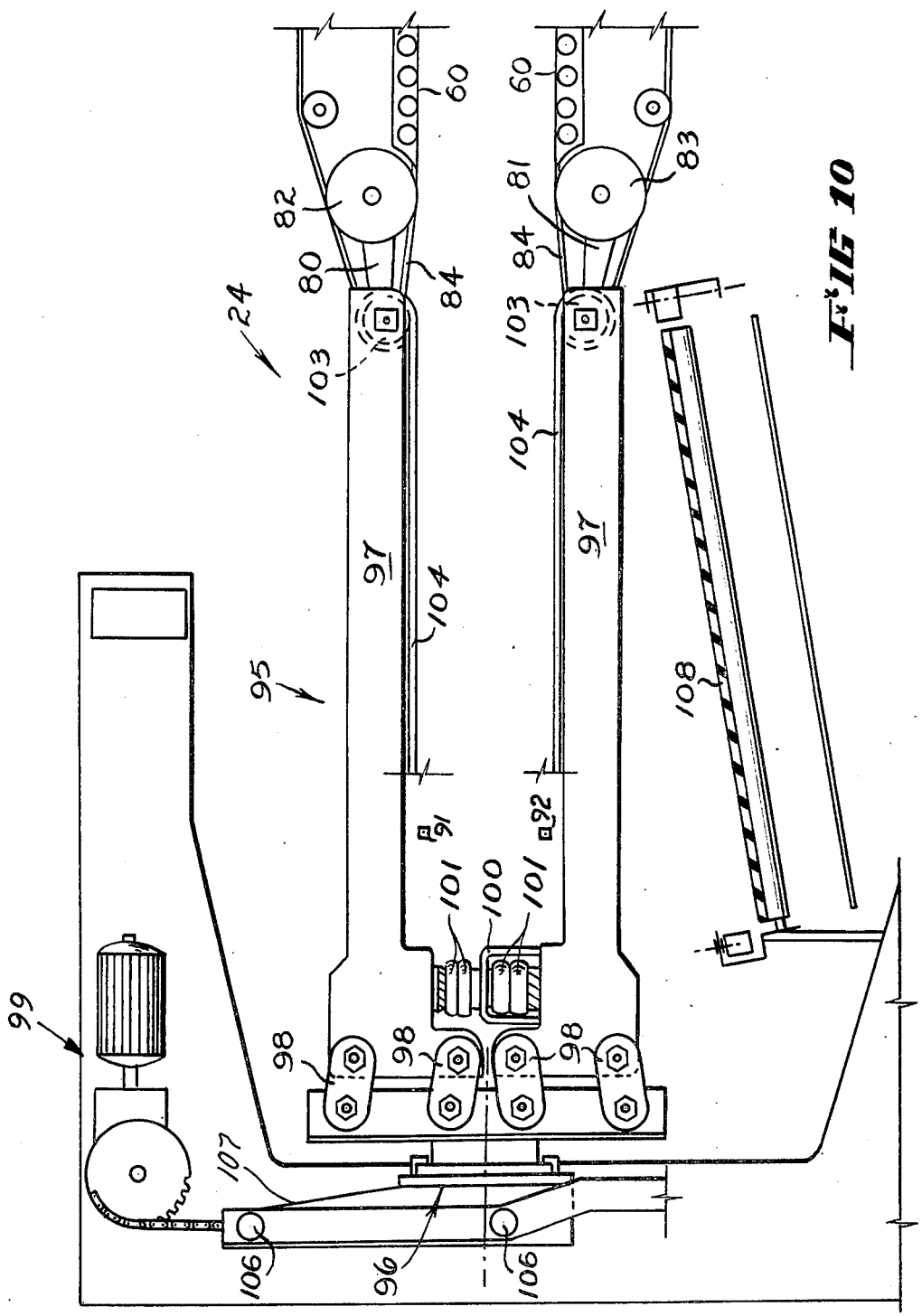
FIG. 10 is an elevational view of tile removing means.
Figure 11:
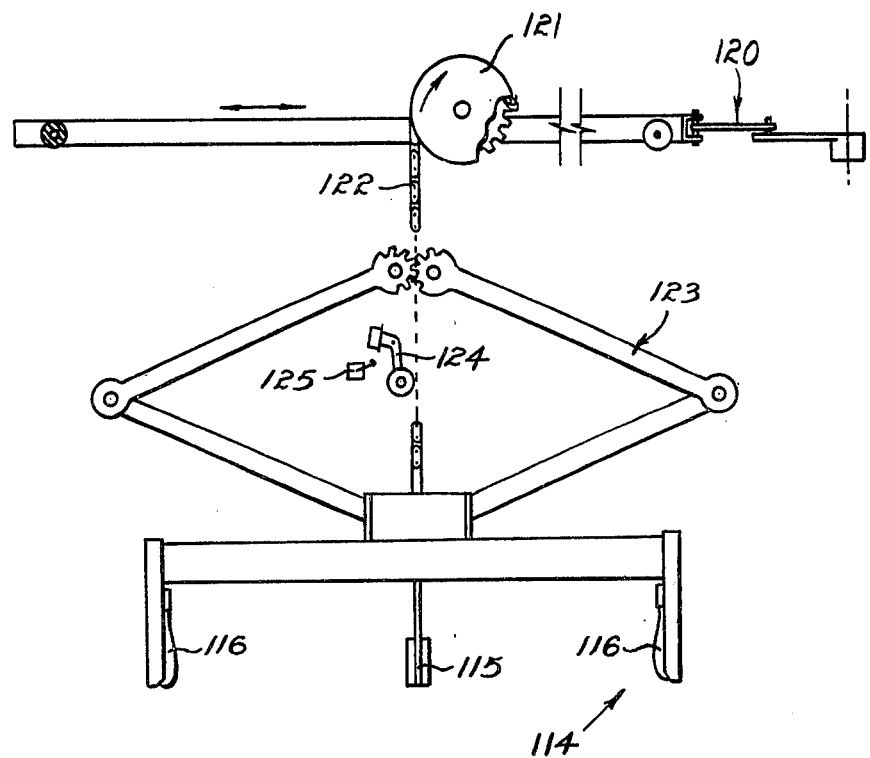
FIG. 11 is an elevational view of a tile stack clamp and carriage assembly.

As said above, the belts 104 of the fork head 95 are separately controlled. The photo-electric cells 2D (91 on FIG. 10) and 2E (92 on FIG. 10) respectively sense and position the top and bottom of the pack by stopping the top belt 104 via the circuit 2F and the bottom belt via the circuit 2G. At the same time, the transfer belts 60 and 84 are de-energised by circuit 2H.

When the top of the pack is in position (2D) and the bottom of the pack is in position (2E) and a limit switch (2I) indicates that the upper and lower extension arms 80 are out of the way, then the fork head is caused to rotate by the rotation selector 2J. The rotation circuit 2K operates the rotational head 96. By alternating rotation clockwise and anti-clockwise the tile edges are presented in the pallet in such a way that the edges which may require overspray for paint purposes are outermost. A control switch 2L may be used to manually reverse rotation selection.

A limit switch 2L indicates when the forks are horizontal, and this initiates the circuit 2M which lowers the carriage. When the carriage is down, the limit switch 2N senses its location, stopping the lowering mechanism and releasing the forks from their clamping location by the circuit 20. A three-second delay timer 2P allows the clamps to fully release before initiating the circuit 20 to raise the fork head. When the fork head is up, the limit switch 2R senses its position and this stops the fork head raise mechanism.

The ultra-sonic limit switch 2U senses that the pack is on the conveyor below the forks, and this together with the operation of limit switch 2R energises circuit 2V which starts the transverse conveyor belt 108 which continues to run until the limit switch 2W (if it is a 'first' pack), or the ultra-sonic sensor 2Z (if it is a 'second' pack), indicates that the pack is in position at the grouping station 110, whereupon the belt 108 stops.

As the pack of tiles moves along belt 108, ultrasonic limit switch 2S operates which ensures that the pack is clear of the clamps, and through the rotation selector 2J (associated with the earlier-mentioned selector 2J) causes rotation of the head through the circuit 2T back to vertical position.

Figure 15:
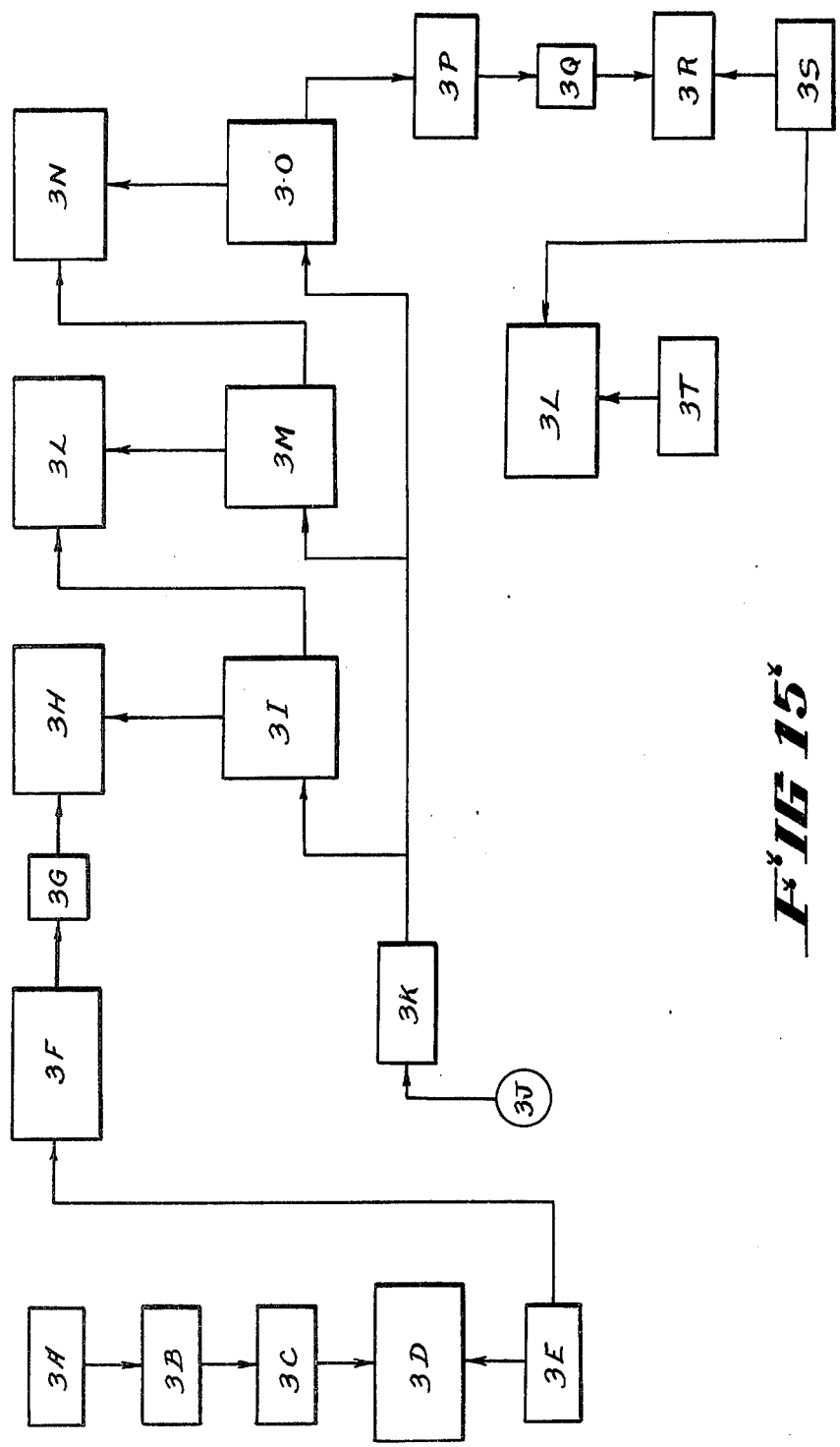
FIG. 15 is a logic diagram of the stacking sequence control of the machine.

As explained above, after the stacks of tiles have been moved on the conveyor belt 108 to come to rest on the rollers 110, they are lifted by the clamp 114 and stacked onto pallets. FIG. 15 indicates the logic circuit for this operation. When a first stack is in position, the limit switch 3A (same limit switch as 2W) indicates this condition, similarly a switch (being ultra-sonic) 3B (same limit switch as 2Z) senses correct positioning of a second stack of tiles, while the limit switch 3C senses that the clamps 114 are in correct position above the stacks. The sprocket 121 is then rotated to lower the clamps over the two side by side stacks, the circuit 3D being energised for this purpose. When the clamps have been lowered, the limit switch 3E (which senses chain slackness) senses that the clamps are in position for gripping the two stacks, and the circuit 3F causes the air bags 116 to be inflated. A timer 3G provides three seconds delay for inflation to take place, whereupon the sprocket 121 is rotated in reverse direction to raise the clamps with their stacks of tiles, being energised by the circuit 3H. When the clamps have raised, the limit switches 3I sense that they have reached their required position.

When the clamps have thus been raised, a push button 3J is operated through a sensing switch 3K which senses that the pallet is tilted back, whereupon the crank mechanism 120 is actuated by the circuit 3L. Furthermore, when 3J and 3K are closed, the limit switch 3M senses that the stacking clamps are in an unloading position, and this causes the stacking clamps to lower through the circuit 3N. When they have been lowered, the chain again slackens and the limit switch 30 (which of course is the same switch as 3E) closes the circuit 3P to release the stacking clamps and after a three second delay due to timer 3Q the stacking clamps raise circuit 3R (which is the same as circuit 3H) causes the stacking clamps to again raise. When the stacking clamps are up, the limit switch 3S (the same as 3I) senses this to be the case and once again the circuit 3L is energised to rotate the crank arm mechanism 120. However when the crank arm has rotated sufficiently that the stacking clamps are in a loading position this is sensed by the limit switch 3R (same as 3C) which de-energises circuit 3L.

Figure 16:
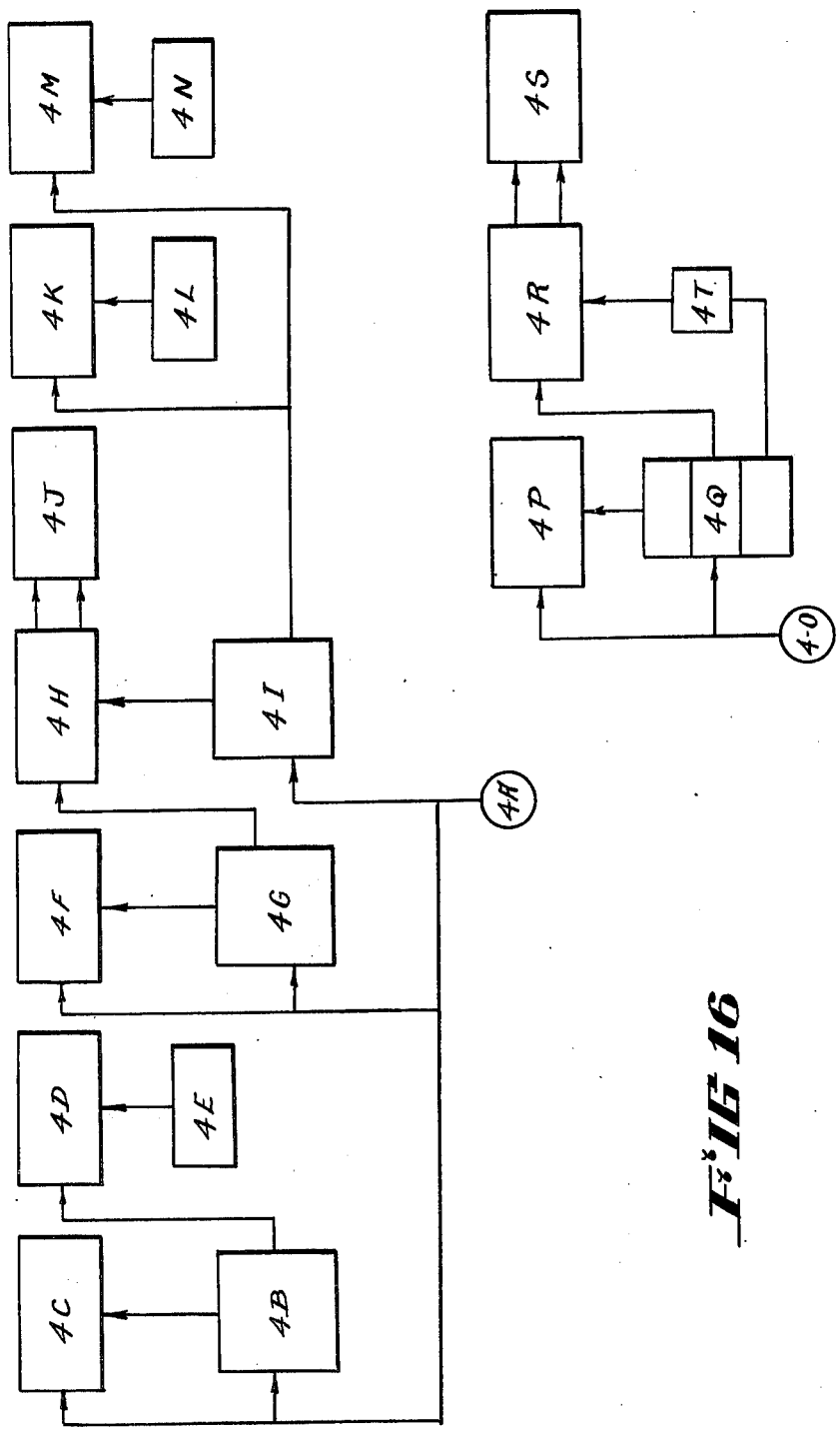
FIG. 16 is a logic diagram of the pallet handling sequence control of the machine.

The final circuit is for the handling of the pallets and this is illustrated diagrammatically in FIG. 16. Pallet discharge is initiated by the push button 4A and this causes the turntable 4C to rotate to a load position until its load position is sensed by the limit switch 4B which causes the stop. At the same time the circuit 4F is energised, lowering the tile stack pallet station which operates limit switch 4G when down. With the turntable in the load position, and the pallet station lowered, the turntable is loaded by the powered rollers of the tile stack pallet station 118, energised by the circuit 4H, and the turntables own powered rollers energised by circuit 4D. At the same time the circuit 4J is energised thereby transporting a new pallet out from the magazine onto the pallet station. When the full pallet is on the turntable, limit switch 4E operates which de-energised circuit 4D stopping the rollers on the turntable only. The pallet station rollers remain on and do not stop until the new pallet from the magazine is in position which is detected by the photo-electric cell combination 4I. When 4I operates, the tile stacking pallet station is caused to tilt by the circuit 4K, and when the pallet has been tilted a limit switch 4L detects this condition and stops the tilting. The magazine 132 holds a plurality of pallets one above the other, and after a pallet has been removed, a further pallet is dropped by the circuit 4M, and the circuit returns to normal position when limit switch 4N operates indicating a pallet has been dropped, ready for transfer from the magazine.

After the turntable has been loaded as mentioned above, a further push button 40 is closed, and the turntable is rotated to an unload position by the circuit 4P, and when the limit switch 4Q senses that it has reached the unload position the turntable rotation is stopped. The turntable itself has a plurality of spaced powered rollers thereon, and these are operated by the circuits 4R and 4S, (same rollers as operated by 4D but in reverse direction) which causes the rollers to operate for 60 seconds through timer 4T to unload the turntable.

For the sake of simplicity, a plurality of incidental functions are not described above. These include fault detection, alarm functions, resetting and restarting functions, emergency stops and manual control functions.

The machine and method disclosed in the specification are capable of handling large volumes of tiles from a tile making machine with very little labour and very little damage to the tiles.

Various modifications in structure and/or function can be made by one skilled in the art to the disclosed embodiments without departing from the scope of the invention as defined by the claims.

We claim:
1. A method of stacking tiles comprising:
(a) supporting each tile successively by one of its relatively large area surfaces in proximity to a first conveyor means,
(b) conveying each successive said tile edgeways with said first conveyor means so that one tile edge leads another tile edge,
(c) gradually tilting each successive said tile while it is being thus conveyed so that it has one of its said edges below the other of its said edges,
(d) transferring each successive said tile from the proximity of said first conveyor means to the proximity of a further conveyor means and supporting said tile by its said lower edge, said further conveyor means comprises a plurality of groups of vertically spaced parallel driven elastomeric belts, there being low speed drive means to all the belts of said groups and high speed drive means to the last belts of said group which are stack transfer belts,
(e) driving said further conveyor means so as to convey each successive said tile while supported by its lower edge, with one of its relatively large area surfaces leading the other relatively large area surface, and at such lower speed than said first conveyor means that successive tiles are caused to lie in close proximity with one another while being conveyed by the further conveyor means, and
(f) removing said tiles from the proximity of said further conveyor means in face to face juxtaposition as a stack by driving all said belts with said low speed drive means at progressively decreasing relatively low speed until a stack of tiles exists between the stack transfer belts, and then driving the stack transfer belts at relatively high speed.

2. A method according to claim 1 wherein said first conveyor means comprises a portion which curves downwardly, and said tilting of each successive tile comprises conveying the tile between adjacent belts past the curved portion to cause downward edgeways movement of the tiles.

3. A method according to claim 2 wherein said transferring of each successive tile comprises arresting said downward edgeways movement of the tile by engaging the leading edge of the tile with the lower of said parallel elastomeric belts and ejecting the upper portion of the tile away from said first conveyor means and engaging the tile upper edge with the upper of said parallel belts.

4. A method according to claim 1 wherein said first conveyor means comprises three conveyors, and steps (b) and (c) comprise elevating tiles in a random spaced relationship at relatively high speed by the first of said three conveyors and into the second of said three conveyors, progressing the tiles in the second of said three conveyors, progressing the tiles in the second of said three conveyors in edge-to-edge relationship at relatively low speed into the third of said three conveyors which comprises a portion which curves downwardly, and conveying said tiles while they are retained by and between adjacent belts of said third of three conveyors in a regular spaced relationship at relatively high speed, and effecting said transference of each successive tile to said further conveyor means from said third conveyor of the first conveyor means.

5. A method according to claim 1 wherein three photocell combinations are located at the proximity of said further conveyor means and control actuation of said first conveyor means, and further comprising sequentially interrupting step (b) of claim 1 by a slave circuit controlled by said photocell combinations and thereby forming the tiles on said further conveyor means into spaced stacks.

6. A method according to claim 1 wherein there is provided tile removing means at the discharge end of said stack transfer means, said tile removing means comprising a pair of vertically spaced parallel fork arms each having thereon a driven belt, and wherein said removing tiles from said further conveyor means further comprises individually driving each of said fork arm belts at the same speed as the high speed drive of said stack transfer belts, and transferring said tile stack between said fork arms, separately terminating upper and lower fork arm drives by sensing when upper and lower surfaces of the leading tile of the stack have completed their respective traverses into the forks.

7. A method according to claim 1 wherein there is provided tile removing means at the discharge end of said further conveyor means, said tile removing means comprising a pair of vertically spaced parallel fork arms each having thereon a driven belt, and wherein said removing tiles from said further conveyor means further comprises driving each of said fork arm belts at the same speed as the high speed drive of said stack transfer belts, and transferring said tile stack between said fork arms, terminating said drive to the fork arm when the stack has completed its traverse into the forks, rotating the fork arms when they contain a stack of tiles, lowering the fork arms together with their stack onto a transverse belt conveyor, separating the fork arms and releasing the stack onto the transverse belt conveyor, raising the fork arms, and conveying the stack transversely away from the proximity of the fork arms.

8. A method according to claim 7 further comprising lifting the stack from said transverse belt conveyor with a lifting device, moving the lifting device together with the stack away from the belt conveyor, and lowering the stack onto a pallet.

9. A method of stacking tiles comprising:
 (a) supporting each tile successively by one of its relatively large area surfaces in proximity to a first conveyor means,
 (b) conveying each successive said tile edgeways with said first conveyor means so that one tile edge leads another tile edge,
 (c) gradually tilting each successive said tile while it is being thus conveyed so that it has one of its said edges below the other of its said edges,
 (d) arresting said edgeways movement of each successive tile and transferring the tiles successively to a further conveyor means, said further conveyor means comprises a plurality of groups of vertically spaced parallel driven elastomeric belts, there being low speed drive means to all the belts of said groups and high speed drive means to the last belts of said group which are stack transfer belts, and
 (e) driving said further conveyor means so as to convey each successive said tile, while supported with its said relatively large area surfaces upright, in a different direction from its direction of travel immediately before arresting its edgeways movement and
 (f) removing the tiles from said further conveyor means by driving all said belts with said low speed drive means at progressively decreasing relatively low speed until a stack of tile exists between the stack transfer belts, and then driving the stack transfer belts at relatively high speed.

10. A tile stacking machine which is suitable for conveying tiles from a tile making machine and forming said tiles into a stack wherein they lie in face to face juxtaposition, comprising:
 first conveyor means having a curved portion which terminates in a tile discharge station at which said first conveyor means has a vertical component of direction, and first conveyor drive means coupled for drive to the first conveyor means, arranged to convey tiles edgeways at relatively high speed from the tile making machine to the discharge station;
 tile transfer means at the locality of said discharge station, the transfer means comprising spring loaded rollers engageable against tile surfaces and operable to tilt the tile upper edges forwardly into engagement with upper belts of a further conveyor means, the
 further conveyor means having its loading end at the discharge station, said further conveyor means comprising spaced upper and lower resilient conveyor belts arranged to retain tiles between them, and further drive means coupled for drive to the conveyor belts and arranged to convey tiles discharged from said discharge station while supported on their lower edges by the lower of said conveyor belts, said further drive means driving said conveyor belts at such relatively slow speed that the tiles are in face to face juxtaposition,
 and tile removing means at the discharge end of said further conveyor.

11. A tile stacking machine according to claim 10 wherein said further conveyor means comprises further upper and lower belts, being resilient transfer belts, and said further drive means comprise high speed drive means, and drive transmission means between the high speed drive means and the transfer belts, said drive transmission means comprising an over-run clutch.

12. A tile stacking machine according to claim 10 wherein said first conveyor means comprises three conveyors in tandem, the first said conveyor being an elevating conveyor, the second said conveyor being a crowding conveyor and the third said conveyor having a portion which curves downwardly and is thereby a tilting conveyor, and said first conveyor drive means comprises respective drive means coupled to the conveyors.

13. A tile stacking machine according to claim 12 wherein the respective drive means are effective to drive said first and third conveyors at relatively high speed, and said second conveyor at relatively low speed.

14. A tile stacking machine according to claim 10 wherein said first conveyor means comprises a first conveyor, a second conveyor and a third conveyor which comprises inner and outer spaced 'V' belts arranged to transport tiles between them, the outer of said spaced 'V' belts terminating at a point displaced upwardly from the inner of said spaced 'V' belts at said discharge station.

15. A tile stacking machine according to claim 10 wherein said tile removing means comprises a pair of spaced fork arms having respective belts thereon, separate drive means coupled to the belts for drive thereof, a rotational mounting head mounting the spaced fork arms, and guide rollers engaging tracks and supporting said mounting head.

16. A tile stacking machine according to claim 15 further comprising lowering means coupled to the rotational head, and a transverse belt conveyor beneath the fork arms, the fork arms being rotational about the rotational mounting, and lowerable by said lowering means to position a stack of tiles retained between the arms on the transverse belt conveyor.

17. A tile stacking machine according to claim 15 further comprising a lifting device, tile stack gripping means on the lifting device, a track guiding the lifting device for transverse movement, a transversely movable belt, and a pallet loading station, arranged so that the lifting device is lowerable over a stack of tiles when on the transversely movable belt, capable of gripping the tiles of the stack and raising them, moving transversely to the pallet loading station, and lowering the stack at said station.

* * * * *